(12) United States Patent
Zhang et al.

(10) Patent No.: US 8,717,459 B2
(45) Date of Patent: May 6, 2014

(54) METHOD AND APPARATUS FOR IMPROVING AUTOMATIC WHITE BALANCE WITH SCENE INFORMATION

(75) Inventors: Buyue Zhang, Plano, TX (US); Rajesh Narasimha, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 12/636,374

(22) Filed: Dec. 11, 2009

(65) Prior Publication Data

US 2010/0149420 A1    Jun. 17, 2010

Related U.S. Application Data

(60) Provisional application No. 61/121,843, filed on Dec. 11, 2008.

(51) Int. Cl.
*H04N 9/73* (2006.01)
*G06K 9/00* (2006.01)

(52) U.S. Cl.
USPC ............ 348/223.1; 348/225.1; 382/167

(58) Field of Classification Search
USPC ............ 348/223.1, 224.1, 225.1; 382/167
See application file for complete search history.

(56) References Cited

U.S. PATENT DOCUMENTS

| | | | | |
|---|---|---|---|---|
| 6,952,225 B1 * | 10/2005 | Hyodo et al. | ............ | 348/223.1 |
| 7,394,930 B2 * | 7/2008 | Trimeche et al. | ............ | 382/167 |
| 8,013,907 B2 * | 9/2011 | Kuang et al. | ............ | 348/223.1 |
| 2004/0208363 A1 * | 10/2004 | Berge et al. | ............ | 382/167 |
| 2008/0062274 A1 * | 3/2008 | Hamamura | ............ | 348/223.1 |
| 2008/0211925 A1 * | 9/2008 | Misawa et al. | ............ | 348/223.1 |

\* cited by examiner

*Primary Examiner* — Nhan T Tran
(74) *Attorney, Agent, or Firm* — Mima Abyad; W. James Brady; Frederick J. Telecky, Jr.

(57) ABSTRACT

A method and apparatus for automatic white balancing of an image. The method includes retrieving scene analysis of the image, determining at least one of the type of the scene and a scene content map utilizing the scene analysis of the image, performing scene adaptive white balance, if overall scene category type is used, perform white balance by applying global R, G, B gains optimized for the global scene type, and if scene segmentation map is used, perform locally adaptive white balance by applying an R, G, B gain map optimized for each scene content.

14 Claims, 4 Drawing Sheets

(a)            (b)

(a)  (b)

(a)  (b)  (c)

METHOD AND APPARATUS FOR IMPROVING AUTOMATIC WHITE BALANCE WITH SCENE INFORMATION

CROSS-REFERENCE TO RELATED APPLICATIONS

This application claims benefit of U.S. provisional patent application Ser. No. 61/121,843, filed Dec. 11, 2008, which is herein incorporated by reference.

BACKGROUND OF THE INVENTION

1. Field of the Invention

Embodiments of the present invention generally relate to a method and apparatus for digital image processing. More specifically, the present invention relates to a method and apparatus for automatic white balancing for processing digital images.

2. Description of the Related Art

In digital image processing, automatic white balancing (AWB) is used to ensure that white color appears white in various illuminations. However, dominate object color is often mistaken for color cast in AWB algorithms. As a result of neutralizing object color, white balance algorithm may introduce unnatural or undesirable color cast to images. Furthermore, it is difficult to achieve optimal rendering of different object colors with one single set of global white balance gains.

Therefore, there is a need for an improved method and/or apparatus for automatic white balancing.

SUMMARY OF THE INVENTION

Embodiments of the present invention relate to a method and apparatus for automatic white balancing of an image. The method includes retrieving scene analysis of the image, determining at least one of the type of the scene and a scene content map utilizing the scene analysis of the image, performing scene adaptive white balance, if overall scene category type is used, perform white balance by applying global R, G, B gains optimized for the global scene type, and if scene segmentation map is used, perform locally adaptive white balance by applying an R, G, B gain map optimized for each scene content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
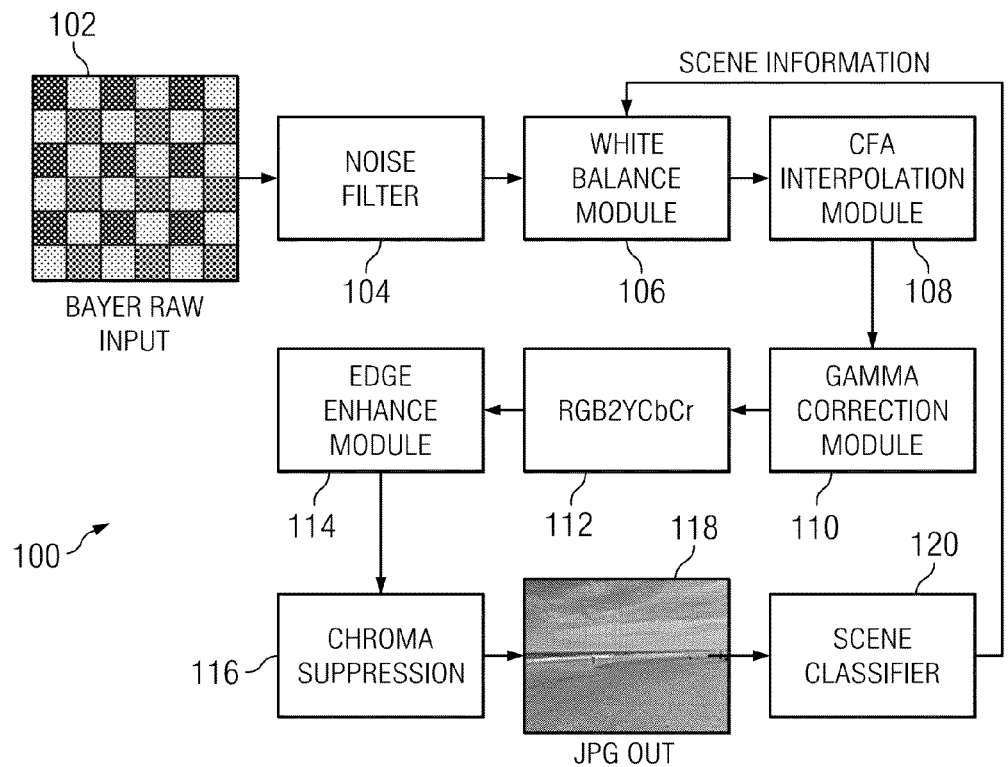
FIG. 1 is an embodiment of an image signal processing apparatus integrated with the automatic white balance module and the scene classification module.

In one embodiment, scene classification method is used to improve color temperature estimation and white balance correction. FIG. 1 is an embodiment of an apparatus 100 for an image pipeline where automatic white balance module and scene classification module are integrated. The apparatus 100 includes image input, such as Bayer raw input 102, noise filter 104, white balance module 106, CFA Interpolation module 108, edge enhance module 114, gamma correction module 110, chroma suppression module 116 and scene classifier 120.

Each image is classified into an overall scene category, such as outdoor sunny, beach scene, snow scene, and portrait etc. Moreover, each image is segmented into different regions based on the scene content, e.g., a beach scene usually contains sand, sky, and sea regions. Outdoor sunny scene usually contains grass, foliage, sky regions, etc. The automatic white balance (AWB) algorithm uses scene information including the content and the location to improve the accuracy of color temperature estimation, gray region extraction, as well as, performing memory color enhancement. In one embodiment, the AWB algorithm is locally adaptive and scene-dependent.

The input to the AWB module in the imaging pipeline may be a Bayer raw input 102 data, and the outputs may be R, G, B gains. In the first pass of the pipeline, AWB may be done without scene information. Once the final processed image from the image pipeline 100 is available such as a JPEG image, the scene classification module may analyze the scene content of the JPEG output of the image pipeline, provides the overall scene type, as well as, a scene classification map back to the white balance module. In the second pass of AWB, the AWB module will check color temperature estimation and will refine the white balance gains with the scene information.

As shown in FIG. 1, the Bayer raw input 102 data is then filtered by the noise filter 104 and white balanced by the white balance module 106. Then, the CFA interpolation module and Gamma correlation module are utilized to generate an RGB2YCbCr 112 data. RGB2YCbCr 112 data is then enhanced by the edge enhancement module 114. Next, the chroma is suppressed in the chroma suppression 116 to generate a JPEG output 118. The scene is then classified by the scene classifier 120 and the scene information 122 is input to the white balance module 106.

Figure 2:
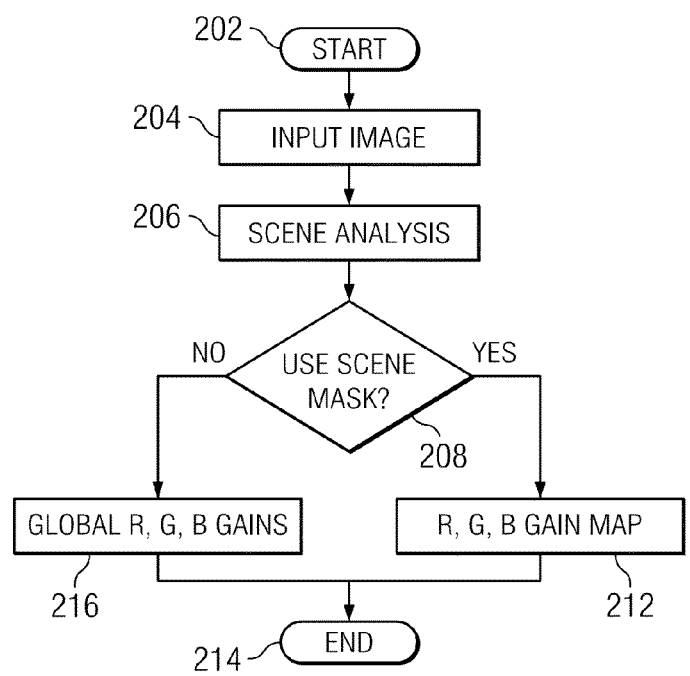
FIG. 2 is a flow diagram depicting an embodiment of a method for automatic white balancing with scene analysis.

FIG. 2 is a flow diagram depicting an embodiment of a method 200 for automatic white balancing with scene analysis. The method 200 starts at step 202 and proceeds to step 204, wherein the input image is retrieved. At step 206, the scene of the image is analyzed, i.e. overall scene category or segmented scene content map (scene mask). At step 208, the method 200 produces determined if a scene mask should be utilized. In one embodiment, the method 200 may utilize an overall scene category, a segmented scene category map or both. If a scene mask is to be utilized, the method 200 proceeds to step 210; otherwise, the method proceeds to step 212. In step 210, global R, G, B gains are utilized. At step 212, R, G, B fain map is utilized. The method 200 proceeds from steps 210 and 212 to step 214, wherein the method 200 ends.

Figure 3:
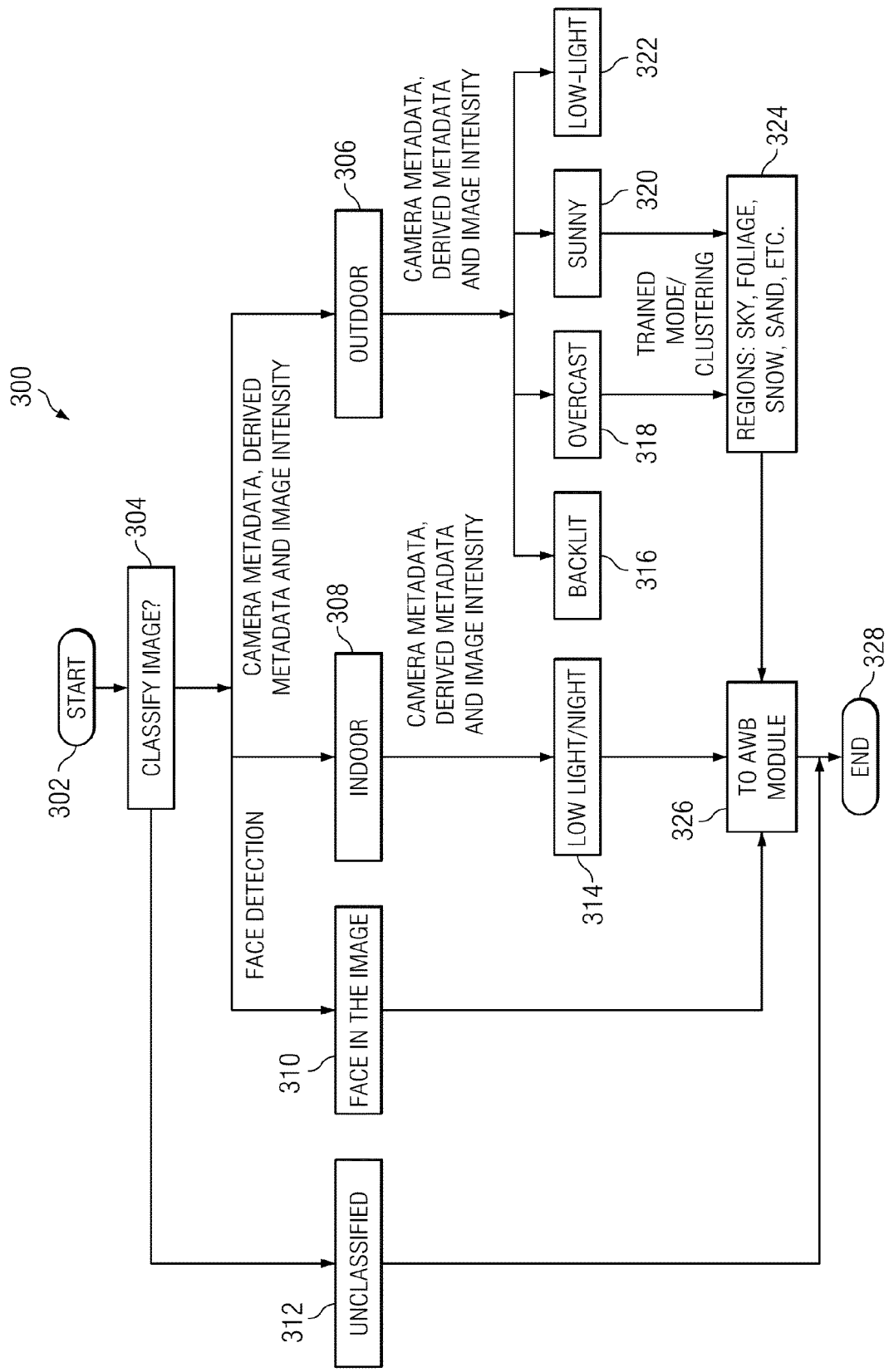
FIG. 3 is a flow diagram depicting an embodiment of a method for classifying a scene and using the scene maps to adjust the R, G and B gains.

FIG. 3 is a flow diagram depicting an embodiment of a method 300 for classifying a scene. The method 300 starts at step 302 and proceeds to step 304. At step 304, the method 300 detects whether an image is an outdoor, an indoor scene or if it includes a face. If it is an outdoor image, the method 300 proceeds to step 306. If it is an indoor scene image, the method 300 proceeds to step 308. If there is a face in the image, the method 300 proceeds to step 310. Otherwise the image is considered unclassified and the method 300 proceeds to step 312.

If the image is an indoor image, the method 300 proceeds to step 314, wherein a low light or night classification is selected. If the image is determined to be an outdoor scene, the image would then be classified as backlit 316, overcast 318, sunny 320 or low light/night 322. If the image is determined to be overcast 318 or sunny 320, region information is provided is step 324, such as, sky, foliage, snow, sand, etc. Based on these inputs, the method 200 proceeds to AWB module in step 326. The method 300 ends at step 328.

There are several strategies for improving white balance result with scene classification information. One may disable or give less weight to color temperature references lower than a certain color temperature (for example 4000K) for images that belong to the outdoor sunny category.

Figure 4:
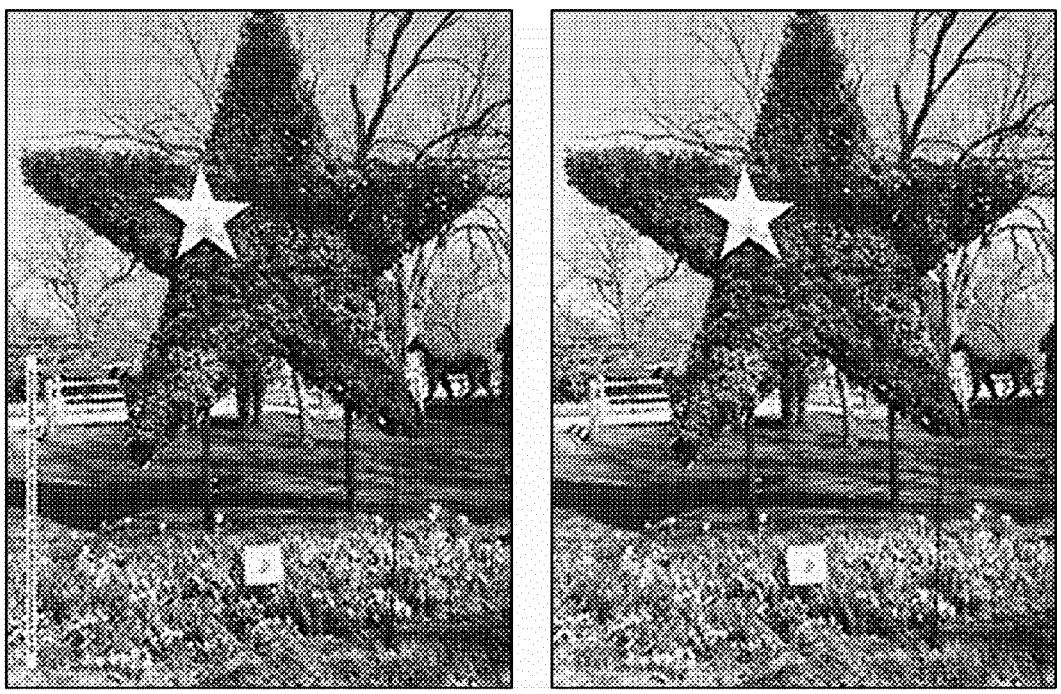
FIGS. 4 (a) and (b) are an embodiment of images, where (a) is an image with resulting from a first pass automatic white balancing without scene information, and (b) is an image resulting from a second pass automatic white balancing after utilizing the scene information.

An example is shown in FIG. 4. FIGS. 4 (a) and (b) are an embodiment of images, where (a) is an image with resulting from automatic white balancing without scene information, and (b) is an image resulting from automatic white balancing with scene information. Without scene information, white balance algorithm estimated the color temperature for this image to be 4000K, which is too low an estimation and leads to an unnatural blue cast (FIG. 4 (a)). The scene classifier, however, is able to recognize this image as an outdoor sunny scene and feed that information to the AWB module. With the scene information, the AWB module disables or places less weight for color temperature references that are not possible for outdoor sunny scenes, which is, in our experiment, color temperature below 4500K. The result is shown in FIG. 4 (b), with a much more accurate white balance correction.

In one embodiment, region-prioritized white balance may be utilized. Observers' interest levels for different content regions of their photographs are different. Therefore, given the segmented scene content, AWB gains can be optimized for one or several scene contents to achieve the overall best color with one set of AWB gains. For example, face/skin color is perceived far more important than any other contents in determining the overall quality of the picture. If face is detected in the image, and they occupy more than a trivial portion of the image, we will optimize white balance gains for the best rendering of the skin colors.

Figure 5:
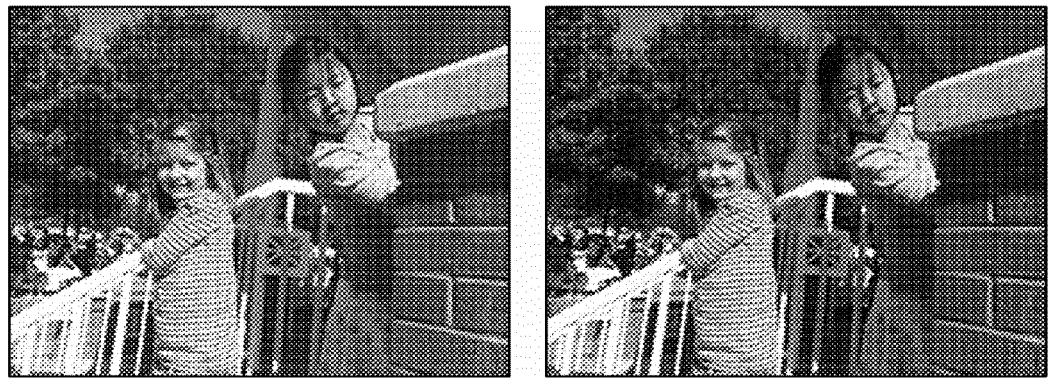
FIGS. 5 (a) and (b) are an embodiment of images, where (a) is an image with resulting from automatic white balancing without face prioritization, and (b) is an image resulting from automatic white balancing with face prioritization.

FIGS. 5 (a) and (b) are an embodiment of images, where (a) is an image with resulting from automatic white balancing without face prioritization, and (b) is an image resulting from automatic white balancing with face prioritization. In FIG. 5 (a), the rendering of foliage and sky are more pleasing than those of FIG. 5 (b), however, since the skin color of the faces in FIG. 5 (b) is more natural, (b) is still regarded having an overall better color than (a) does. It demonstrates the importance of the pleasing rendering of the "face" to the overall image quality.

In one embodiment, locally adaptive white balance correction may be utilized. In white balance, one set of global R, G, B gains usually cannot provide the optimal rendering of all image contents. The solution to this problem is to adopt different white balance gains for different regions of the images based on their contents. In this case, the AWB module outputs a gain mask which contains different R, G, B gains for different pixels or blocks in the image depending on the scene content they belong to. An example is shown in FIG. 6.

Figure 6:
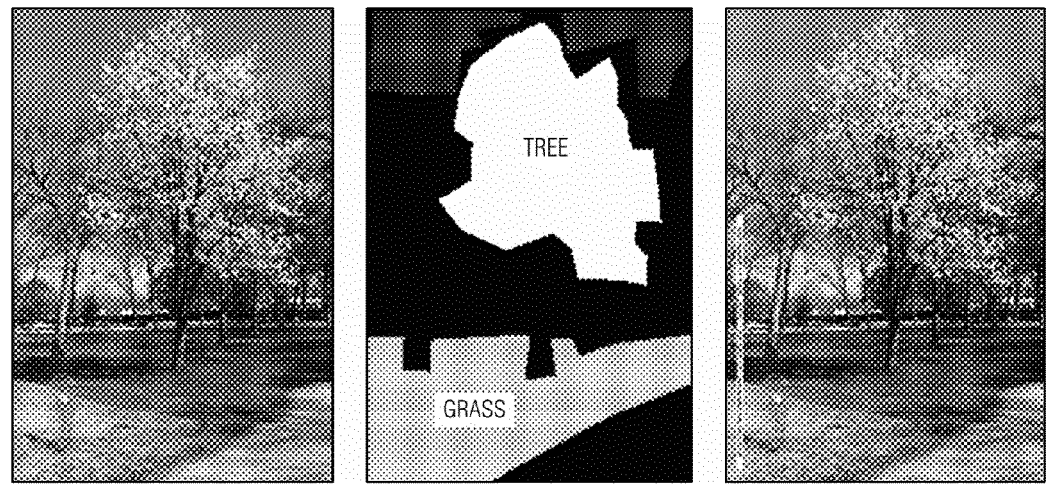
FIGS. 6 (a), (b) and (c) are an embodiment of images, where (a) is an image with resulting from global automatic white balancing without the scene segmentation map (scene mask), (b) is an embodiment of the scene mask with scene content tags for (a), and (c) is an image resulting from locally adaptive automatic white balancing using scene mask.

FIGS. 6 (a), (b) and (c) are an embodiment of images, where (a) is an image with resulting from global automatic white balancing without scene mask (scene segmentation map), (b) is an embodiment of the segmentation map with scene content tags for (a), and (c) is an image resulting from locally adaptive automatic white balancing using scene mask. The result of non-adaptive AWB shown in FIG. 6(a) is, using one set of global RGB gains. The scene classifier can indicate that this image is an outdoor sunny scene. Furthermore, it can also provide a scene mask for this image. The scene mask tells which pixel/block in the image belongs to which content class: tree, sky, or grass, as shown in FIG. 6(b). With this information, the AWB refines the RGB gains for the different content regions, and achieves more pleasing color rendering for the image, as shown in FIG. 6(c).

As such, by using scene information, white balance failures due to dominate object colors are reduced. Furthermore, embodiments of the current invention may achieve more pleasing colors by combining white balance and memory color enhancement.

It should be noted that any of the above described method may be performed by a digital processor (DSP). Furthermore, a computer readable medium is any medium that is utilized by a computer for data retrieving, executing, archiving, storing and the like.

While the foregoing is directed to embodiments of the present invention, other and further embodiments of the invention may be devised without departing from the basic scope thereof, and the scope thereof is determined by the claims that follow.

What is claimed is:

1. A method for a digital signal processor for automatic white balancing of an image, comprising:
   retrieving scene analysis of the image;
   determining a scene classification map relating to light, a type of the scene relating to scene locality and a scene content map utilizing the scene analysis of the image;
   performing scene adaptive white balance;
   if overall scene category type is used, perform white balance by applying global R, G, B gains optimized for the global scene type, wherein the automated white balancing is performed more than once on at least a portion of the image utilizing scene information from a prior automatic white balancing; and
   if scene segmentation map is used, perform locally adaptive white balance by applying an R, G, B gain map optimized for each scene content.

2. The method of claim 1, wherein the step of determining the scene type comprises determining if the scene is at least one of an indoor scene, outdoor scene or a scene that includes a face.

3. The method of claim 1, wherein the method is performed more than once on at least a portion of the image.

4. The method of claim 1, wherein the automatic white balancing is performed with face prioritization.

5. The method of claim 1, wherein the automatic white balancing is performed at least one of without scene mask, with scene masking and with locally adaptive automatic white balancing.

6. An apparatus for automatic white balancing of an image, comprising:
- means for retrieving scene content information of the image;
- determining a scene classification map relating to light, a type of the scene relating to scene locality and a scene content map utilizing the scene analysis of the image;
- means for performing scene adaptive white balance, wherein the automated white balancing is performed more than once on at least a portion of the image utilizing scene information from a prior automatic white balancing;
- If an overall scene category type is used, applying global R, G, B gains optimized for this scene category; and
- if scene content map is used, applying locally adaptive white balance correction with a R, G, B gain map optimized for each scene content region.

7. The apparatus of claim 6, wherein the means for determining the scene type comprises a means for determining if the scene is at least one of an indoor scene, outdoor scene or a scene that includes a face.

8. The apparatus of claim 6, wherein the automatic white balancing is performed with face prioritization.

9. The apparatus of claim 6, wherein the automatic white balancing is performed at least one of without scene masking, with scene masking, and with locally adaptive automatic white balancing.

10. A non-transitory computer readable medium comprising software that, when executed by a processor, causes the processor to perform a method for automatic white balancing of an image, the method comprising:
- retrieving scene information of the image;
- determining a scene classification map relating to light, a type of the scene relating to scene locality and a scene content map utilizing the scene analysis of the image;
- performing scene adaptive white balance, wherein the automated white balancing is performed more than once on at least a portion of the image utilizing scene information from a prior automatic white balancing;
- If an overall scene category type is used, applying global R, G, B gains optimized for this scene category; and
- if scene content map is used, applying locally adaptive white balance correction with a R, G, B gain map optimized for each scene content region.

11. The computer readable medium of claim 10, wherein the step of determining the scene type comprises determining if the scene is at least one of an indoor scene, outdoor scene or a scene that includes a face.

12. The computer readable medium of claim 10, wherein the method is performed more than once on at least a portion of the image.

13. The computer readable medium of claim 10, wherein the automatic white balancing is performed with face prioritization.

14. The computer readable medium of claim 10, wherein the automatic white balancing is performed at least one of without scene masking, with scene masking, and with locally adaptive automatic white balancing.

* * * * *